United States Patent [19]
Gustafson

[11] Patent Number: 5,133,623
[45] Date of Patent: Jul. 28, 1992

[54] SOLID WASTE DISPOSAL SYSTEM
[76] Inventor: Leif V. Gustafson, 17902 Hyacinth Dr., Sun City West, Ariz. 85375
[21] Appl. No.: 760,486
[22] Filed: Sep. 16, 1991
[51] Int. Cl.⁵ .............................................. B09B 1/00
[52] U.S. Cl. ..................................... 405/128; 210/170; 405/52; 405/129
[58] Field of Search ................ 405/52, 128, 129, 154; 210/170

[56] References Cited
U.S. PATENT DOCUMENTS

| | | | |
|---|---|---|---|
| 4,117,683 | 10/1978 | Rasmussen | 405/52 X |
| 4,248,548 | 2/1981 | Danford | 405/129 |
| 4,252,462 | 2/1981 | Klingle et al. | 405/129 |
| 4,360,427 | 11/1982 | Posgate | 210/170 |
| 4,368,120 | 1/1983 | Martone et al. | 210/170 |
| 4,469,596 | 9/1984 | Kantor | 210/170 X |

Primary Examiner—David H. Corbin

[57] ABSTRACT

A process of moving solid waste in pipelines partially filled with fresh or sea water pumped to locations in the Western States where there are many millions of acres of wasteland that could be converted into usable landfills and with a portion, as desired, burned in a waste incinerator plant. In this system, sea water will be used for converting to fresh water for personnel and equipment uses, other portions for a cooling pond for the power plant, a fish hatchery, shrimp farm, and finally a recreation lake.

In this venture, principal cost is high. However, operating cost and the many benefits created will greatly offset installation cost. The necessity for a better disposal of solid waste is a must.

15 Claims, 1 Drawing Sheet

SOLID WASTE DISPOSAL SYSTEM

BACKGROUND

1. Field of the Invention

The invention relates to solid waste disposal systems. In particular, the invention relates to the water-borne transport of solid waste through pipes containing water. The solid waste is immersed in the moving water and is transported through the pipes with the water. Interstate movement of waste and water from "wet" states to "dry" states is proposed.

2. Prior Art

In the not too distant future, the disposal of solid waste will have a magnitude of such proportions that each state, especially on the East Coast, cannot dispose of this vast amount of material in the system presently used.

We have shipped solid waste to England. We have tried to peddle solid waste to several other countries. We are polluting our land and water everywhere. We are even polluting the oceans.

In the present system of landfills or incineration, wherever located, there are going to be objections. People simply want the waste to disappear. These are not easy problems and every prosperous country in the world has a similar situation. We're not willing to do something as a society until we face a crisis. This is classic Crisis Management.

We presently have 27 states which have approximately three (3) to five (5) years before running out of space for solid waste landfills. In many places recycling already exists. However, such recycling is only applicable to aluminum cans, newspapers and glass, and sometimes telephone books.

The landfill trail for solid waste is littered with studies and consultants, but obviously solid waste landfills must not be perpetuated in populated areas. We certainly are courting disaster in many areas ... a situation that does not have to be.

We are presently generating about 160 million tons of solid waste per year, a quantity that will increase with time and we have already run out of space in some states to place this material.

The major portion of the waste material in landfills is all types of paper, including telephone books. The biodegrading of this material may take decades. Other items are fast food plastic foam cartons that will not break down but create toxic gases. Disposal diapers and pull-ups contain polypropylene, making their breakdown extremely slow and toxic. The disposal of fecal matter from diapers into landfills is another item causing pollution.

The declining number of landfills has caused communities to transport their waste greater distances, often across state lines, which of course has increased disposal costs. The latest estimate for landfills is $750,000 per acre for preparation of site. The carbon dioxide and the methane gas is vented, but the real danger is that the ground water and adjoining bodies of water will be infested with methanol ($CH_2OH$) which is a colorless, volatile, flammable, poisonous liquid which is also created by the decomposition of garbage.

In the existing system, each community governs the operation of waste disposal and The Environmental Protection Agency (E.P.A.) can only monitor and check that the procedure is not violating environmental standards.

SUMMARY OF THE INVENTION

The invention is a solid waste disposal system where its elements include a source of solid waste and an abundant source of water, the waste being transportable under the impress of moving water in which the waste is immersed. A conduit couples the source of solid waste with the disposal site to transfer water and water immersed solid waste from the source of solid waste to the waste disposal site, the waste disposal site having means for the receipt and disposal of solid waste and means for the receipt and transfer of water used to transport the solid waste. Ideally, the source of solid waste is located in a region having a surplus water supply while the waste disposal site is located in a region lacking such a surplus supply. The means for the receipt and transfer of water further comprises water utilization means for utilizing water transferred via the conduit to the disposal site. In a presently preferred embodiment of the invention the means for the receipt and disposal of solid waste comprises the transfer to landfills and to a lesser extent to a waste incinerator plant. The incineration plant system is equipped with a waste heat boiler producing steam to operate an electric power generating plant. The water utilization further comprises means for cooling equipment within the electric power generating plant. In other preferred embodiments of the invention, the water utilization may further comprise any one or all of a fish hatchery, a shrimp farm, a recreational water storage facility, and/or means for treating the water and rendering it potable.

By way of exposition, and not of limitation: the water transportation system will function well in cases in which the solid waste has a mass more or less in the range of 20 to 45 pounds per cubic foot.

DETAILED DESCRIPTION OF THE INVENTION

Figure 1:
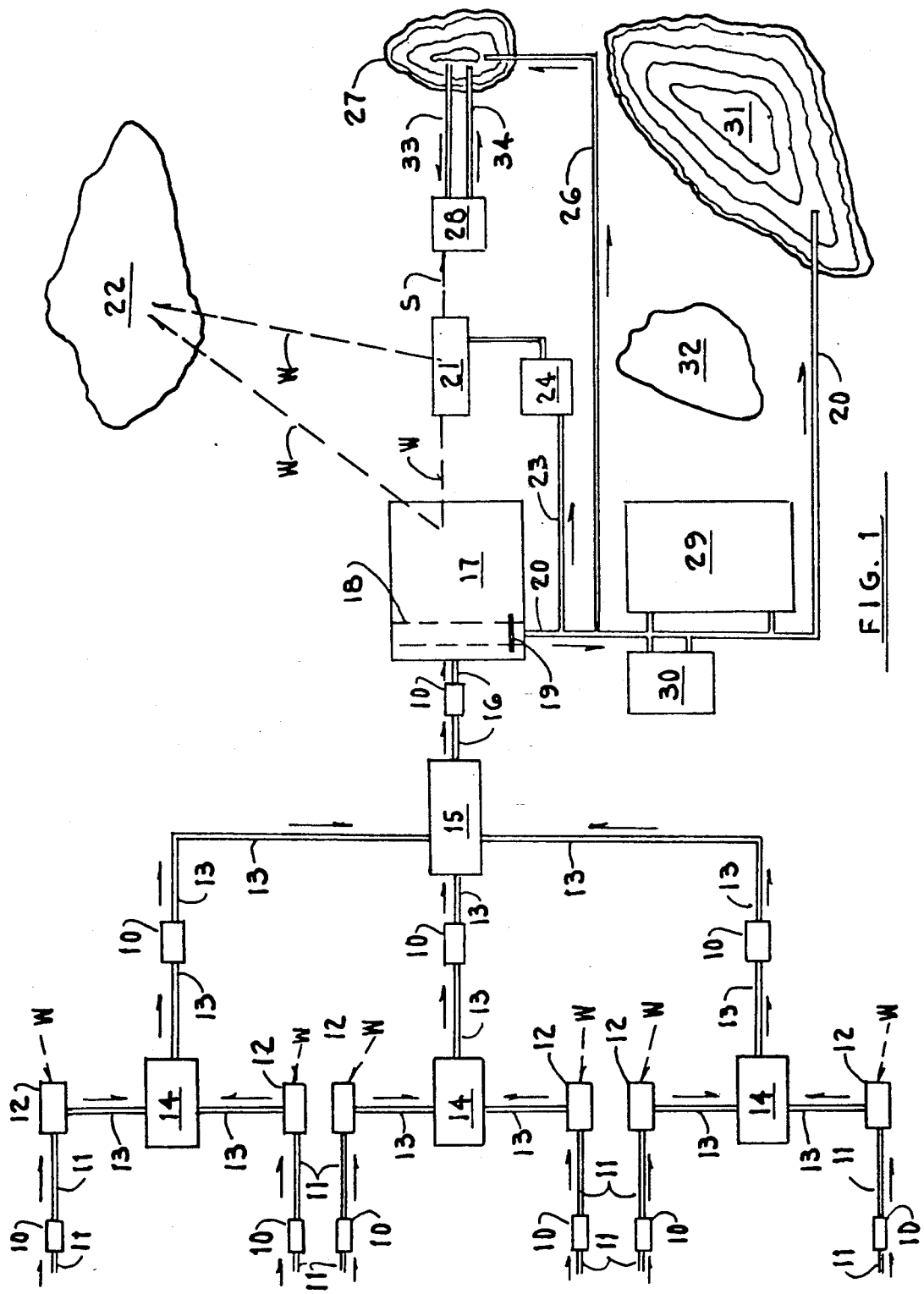
FIG. 1 is an overall flow diagram of the process of this invention in collecting, transporting and processing solid waste.

For purposes of promoting an understanding of the principles of the invention, reference will now be made to the embodiments illustrated in the drawing and specific language will be used to describe same. It will nevertheless be understood that no limitation of the scope of the invention is hereby intended, there being contemplated such alterations and modifications of the illustrated device, and such further applications of the principles of the invention as disclosed herein, as would normally occur to one skilled in the art to which the invention pertains.

As illustrated in FIG. 1, water is extracted from the ocean or lake (not shown) by pumping stations 10, moving the water through pipeline 11 to solid waste loading station 12. Pipeline 13 moves the water together with the solid waste W, injected at station 12, to transfer station 14. It is anticipated that there will be a multitude of pumping stations 10, loading stations 12 and transfer stations 14 feeding into the major solid waste collection station 15.

From collection station 15, solid waste well be routed through the major solid waste conveying pipeline 16 to the disposal area 17. Area 17 has a concrete slab surface with grating covered trough 18. At the water exit area a bar screen and traveling water screen 19 are located to prevent particles from entering flume 20. Solid waste W in area 17 will be transferred to waste incinerator plant 21 and waste landfill area 22. A portion of the water in flume 20 is transferred to flume 23 to the chemical treatment plant (reverse osmosis) 24 for supply of drinking water and for the operational need in the waste incinerator plant 21. Fresh water is piped to solid waste incinerator plant 21 through pipeline 25. Another portion of water in flume 20 is routed through flume 26 to pond 27 which will act as a cooling pond. The water is circulated in pipelines 33 and 34 through electric power generating plant 28. Shrimp farm 29 and fish hatchery 30 are supplied water from flume 20 and water is further flumed to recreation lake 31. Area 32 indicates a location for a new community to service operations.

The solution and design is based upon a statewide operated system for maximum efficiency and the least cost.

The western states have millions of acres of wasteland, especially eastern California and western Arizona. The land can be converted into useful areas. Hence the next problem is how to get the solid waste from here to there.

The system herein proposed is to install concrete pipes 11, 13 and 16 above ground in highway medians or along shoulders or across open areas, wherever would be the most suitable locations. In certain locations the piping has to go underground; however, this should be kept to a minimum.

The moving of solid waste is by pumping sea or fresh water into the pipes 13 at the starting points, with pumping stations 10 at necessary intervals. Thus, this becomes a 24-hour operation with velocities of flow and size of pipe determined by quantities to be moved. Sea water weighs 64 pounds per cubic foot, fresh water 61 pounds per cubic foot and solid waste from 26 to 37 pounds per cubic foot. A pipe flowing one-quarter to three-eighths full of water and one-half full of solid waste, results in about three-quarters full total.

If the velocity of flow in the pipes is set to five ft/sec the solid wast will move 1,000 miles in twelve days.

The quantities moved based upon a weight of thirty-one pounds per cubic foot will be as follows:
6 foot diameter pipe, 34 million tons per year
8 foot diameter pipe, 61 million tons per year
10 foot diameter pipe, 96 million tons per year
12 diameter pipe, 138 million tons per year
14 foot diameter pipe, 188 million tons per year Coastal states having direct access to water would be prime locations for the use of this system, especially where wasteland areas are available. Adjoining states can either tap into the water supply or continue the pipeline carrying solid waste through the state and into the next state. Loading stations 12, transfer stations 14, and pump stations 10 will be added as required.

The ultimate system would be to route pipelines from the eastern states to terminals in large desert areas in the western states. Millions of acres in a desert wasteland can be turned into useful productive areas, benefiting every state in the union.

The solid waste will be disposed of as follows:
1. Due to the large amount of solid waste to be disposed of, a mechanical system with below grade loading hoppers and large belt conveyors with adjustable routes would be the most efficient system to be used for transportation to the landfill areas 22 from disposal areas 17.

2. If it is desirable, portions of the solid waste can be incinerated.

The water will be used as follows:
1. A portion of the water will be piped to a chemical treatment plant 24 where it will be analyzed to determine the impurities and the effect created on the equipment. A reverse osmosis process can be used for the supply of fresh water.

2. A portion of the water will be flumed to a small lake 27 to be used as a cooling pond for the generators in the power plant.

3. A major portion of water will be flumed through baffles and traveling water screens into an area constructed for shrimp ponds 29 and fish hatcheries 30. It is conceivable that the creation of shrimp ponds 29 and fish hatcheries 30 can become a very large venture that will create many jobs and be a profitable business.

4. After the water has been circulated through shrimp ponds 29 and fish hatcheries 30, it will be flumed to an area set aside for a recreation lake 31 to be used for fishing, camping, boating, motels, restaurants and service stations.

The present cost per acre for the preparation of a landfill is approximately $750,000, and acreage for that purpose is going to be less and less available as time goes on. At the present time, there are some states transporting their waste to other states where landfill areas are available. The cost of that type of operation is high and in the further will be prohibitive. Therefore, the expected cost of installing a transportation system as herein proposed will be much more practicable in the long run and of lesser cost. It is a one-time installation cost and with the additionally created businesses at the terminal ends can offset the operating costs.

Having described the invention in the foregoing description and drawing in such a clear and concise manner that those skilled in the may readily understand and practice this invention, that which is claimed is:

1. A solid waste disposal system comprising:
   a source of solid waste, said waste being transportable under the impress of moving water in which said waste is immersed;
   a waste disposal site having the receipt and means for disposal of solid waste and the receipt and means for the transfer of water used to transport said solid waste;
   a conduit coupling said source of solid waste and said disposal site for transferring water and water immersed solid waste from said source of solid waste to said disposal site; and
   a source of moving water coupled to said conduit for flooding said conduit and transporting within said conduit solid waste injected into said conduit and immersed in said moving water.

2. The disposal system of claim 1 said source of solid waste being located in a region having a surplus water supply.

3. The disposal system of claim 2 said waste disposal site being located in a region lacking a surplus water supply.

4. The disposal system of claim 3 said means for the receipt and transfer of water further comprising water utilization means for utilizing water transferred via said conduit to said disposal site.

5. The disposal system of claim, 4 wherein said means for the receipt and disposal of solid waste comprises the incineration of waste in a plant equipped with a waste heat boiler which will produce steam for operating an electric generating plant and water utilization further comprises means for cooling equipment within said electric power generating plant.

6. The disposal system of claim 4 said water utilization means further comprising a fish hatchery.

7. The disposal system of claim 4 said water utilization means further comprising a shrimp farm.

8. The disposal system of claim 4 said water utilization means further comprising a recreational water storage facility.

9. The disposal system of claim 4 said water utilization means further comprising means for treating said water and rendering it potable.

10. The disposal system of claim 1 said means for the receipt and transfer of water further comprising water utilization means for utilizing water transferred via said conduit to said disposal site.

11. The disposal system of claim 10 wherein said means for the receipt and disposal of solid waste comprises the incineration of waste in a plant equipped with a waste heat boiler which will produce steam for operating an electric generating plant and water utilization further comprises means for cooling equipment within said electric power generating plant.

12. The disposal system of claim 10 said water utilization means further comprising a fish hatchery..

13. The disposal system of claim 10 said water utilization means further comprising a shrimp farm.

14. The disposal system of claim 10 said water utilization means further comprising a recreational water storage facility.

15. The disposal system of claim 10 said water utilization means further comprising means for treating said water and rendering it potable.

* * * * *